(12) United States Patent
Kitai

(10) Patent No.: US 10,389,913 B2
(45) Date of Patent: Aug. 20, 2019

(54) INFORMATION MANAGEMENT CONTROL APPARATUS, IMAGE PROCESSING APPARATUS, AND INFORMATION MANAGEMENT CONTROL SYSTEM

(71) Applicant: FUJI XEROX CO., LTD., Tokyo (JP)

(72) Inventor: Tsubasa Kitai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/810,574

(22) Filed: Nov. 13, 2017

(65) Prior Publication Data
US 2018/0288279 A1 Oct. 4, 2018

(30) Foreign Application Priority Data
Mar. 29, 2017 (JP) .................. 2017-065905

(51) Int. Cl.
*G06F 15/00* (2006.01)
*H04N 1/44* (2006.01)
(Continued)

(52) U.S. Cl.
CPC ......... *H04N 1/4413* (2013.01); *G06F 3/1222* (2013.01); *G06F 3/1238* (2013.01); *G06F 3/1285* (2013.01); *H04L 63/0428* (2013.01); *H04L 63/061* (2013.01); *H04L 63/083* (2013.01); *H04L 63/0815* (2013.01); *H04N 1/32128* (2013.01); *H04N 1/4426* (2013.01); *H04W 12/06* (2013.01); *H04L 63/06* (2013.01); *H04L 63/08* (2013.01); *H04L 63/10* (2013.01);
(Continued)

(58) Field of Classification Search
CPC ............... H04N 1/4413; H04N 1/4426; H04N 1/32128; G06F 3/1222; G06F 3/1238; H04L 63/061; H04L 63/0815
USPC ......................................................... 358/1.14
See application file for complete search history.

(56) References Cited

U.S. PATENT DOCUMENTS

| | | | |
|---|---|---|---|
| 2003/0099353 A1* | 5/2003 | Goh ..................... | G06Q 20/389 380/51 |
| 2006/0136726 A1* | 6/2006 | Ragnet ................. | G06F 21/608 713/171 |

(Continued)

FOREIGN PATENT DOCUMENTS

| | | |
|---|---|---|
| JP | H06-021939 A | 1/1994 |
| JP | 2012-138071 A | 7/2012 |

(Continued)

*Primary Examiner* — Mark R Milia
(74) *Attorney, Agent, or Firm* — Oliff PLC

(57) ABSTRACT

An information management control apparatus includes a storage unit, a transmission unit, and a permission unit. The storage unit stores a job including one of a pair of keys, with which both encryption and decryption are possible, and address information. The transmission unit encrypts a user ID of a login user by using the one of the keys and transmits the encrypted user ID through a communication unit in accordance with the address information, the user having been logged in in order to issue an instruction for executing the job. The permission unit permits execution of the job, in a case in which a user ID that has been encrypted by using the other of the keys and transmitted in response to the transmission is decrypted by using the one of the keys, if the user ID is the same as the user ID of the login user.

8 Claims, 11 Drawing Sheets

(51) Int. Cl.
*G06F 3/12* (2006.01)
*H04L 29/06* (2006.01)
*H04N 1/32* (2006.01)
*H04W 12/06* (2009.01)

(52) U.S. Cl.
CPC ............... *H04N 2201/0094* (2013.01); *H04N 2201/3205* (2013.01); *H04N 2201/3207* (2013.01); *H04N 2201/3246* (2013.01); *H04N 2201/3281* (2013.01)

(56) References Cited

U.S. PATENT DOCUMENTS

2007/0008581 A1* 1/2007 Han .................. G06F 3/1204
                                            358/1.15
2011/0173444 A1* 7/2011 Sato ................. H04N 1/4413
                                            713/165
2017/0085751 A1* 3/2017 Kakutani ............ H04N 1/4413

FOREIGN PATENT DOCUMENTS

JP        2014-167664 A    9/2014
JP        2016-139910 A    8/2016

* cited by examiner

INFORMATION MANAGEMENT CONTROL
APPARATUS, IMAGE PROCESSING
APPARATUS, AND INFORMATION
MANAGEMENT CONTROL SYSTEM

CROSS-REFERENCE TO RELATED APPLICATIONS

This application is based on and claims priority under 35 USC 119 from Japanese Patent Application No. 2017-065905 filed Mar. 29, 2017.

BACKGROUND

Technical Field

The present invention relates to an information management control apparatus, an image processing apparatus, and an information management control system.

SUMMARY

According to an aspect of the invention, there is provided an information management control apparatus including a storage unit, a transmission unit, and a permission unit. The storage unit is configured to store a job in which one of a pair of keys, with which both encryption and decryption are possible, and address information are added. The transmission unit is configured to encrypt a user ID of a login user by using the one of the keys added in the job and to transmit the encrypted user ID through a communication unit in accordance with the address information, the user having been logged in in order to issue an instruction for executing the job. The permission unit is configured to permit execution of the job, in a case in which a user ID that has been encrypted by using the other of the keys and transmitted in response to the transmission is decrypted by using the one of the keys, if the user ID is the same as the user ID of the login user.

BRIEF DESCRIPTION OF THE DRAWINGS

An exemplary embodiment of the present invention will be described in detail based on the following figures, wherein.

DETAILED DESCRIPTION

System Configuration

Figure 1:
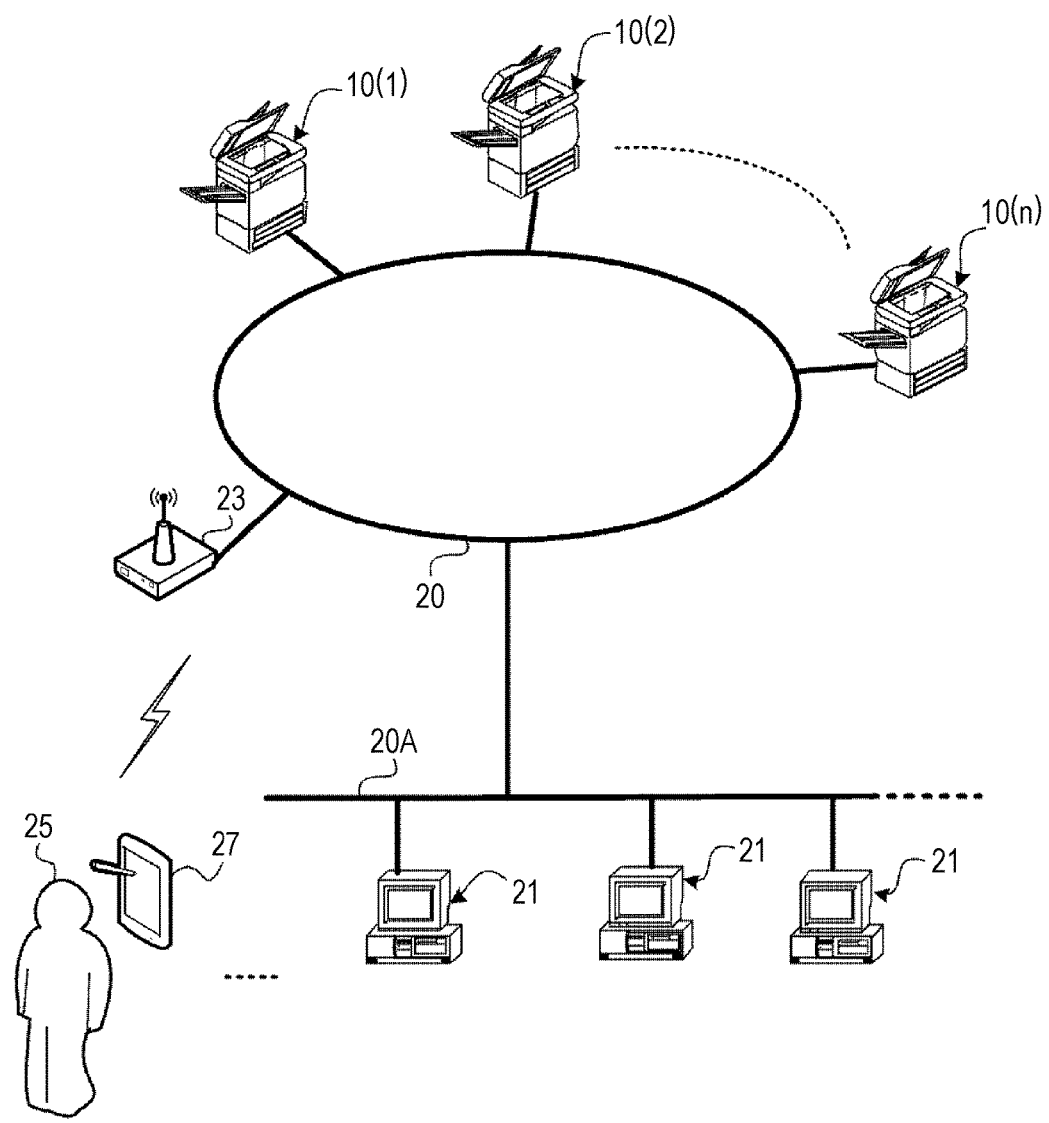
FIG. 1 schematically illustrates an information management control system according to the exemplary embodiment.

FIG. 1 illustrates an information management control system according to the exemplary embodiment in which a communication network 20 is positioned in the center.

As illustrated in FIG. 1, as examples of a processing apparatus according to the exemplary embodiment, plural image processing apparatuses 10(1), 10(2), . . . 10(n) (hereinafter referred to as "image processing apparatuses 10" when referring to plural image processing apparatuses or an "image processing apparatus 10" when referring to an unspecific one) are connected to the communication network 20. Although three image processing apparatuses 10 are connected in FIG. 1, the number of image processing apparatuses 10 is not limited to a particular number.

The communication network 20 is, for example, a local area network (LAN), and plural LANs (communication networks 20) may be connected to one another via a wide area network (WAN).

Note that the following description will be given on the assumption that the image processing apparatuses 10 that are set in a predefined region are collectively managed and controlled. However, the following description on such assumption also includes management of a group of image processing apparatuses installed at convenience stores and the like spread in a wide area (e.g., specific area).

As illustrated in FIG. 1, a branch line 20A of the communication network 20 is connected to plural personal computers (PCs) 21. Although three PCs 21 are connected in FIG. 1, the number thereof is not limited to a particular number and may be increased or decreased in accordance with the scale of the communication network 20 (including the number of users who operate the PCs 21). Note that a simple description of the communication network 20 includes the branch line 20A in the following description.

In addition, all the communication networks including the communication network 20 are not necessarily connected by wired connection. That is, information may be transmitted and received by using a wireless communication apparatus 23.

Each image processing apparatus 10 may accept an operation for image formation (print) instruction based on, for example, data transferred to the image processing apparatus 10 from a remote PC 21 or may accept an instruction for a process such as copying, scanning (image reading), or facsimile transmission or reception from a user who stands in front of the image processing apparatus 10 and performs an operation.

The wireless communication apparatus 23 is capable of communicating with a communication base station (omitted from illustration) deployed in a specific area.

The wireless communication apparatus 23 and the communication base station are used when a mobile terminal 27 carried by a user 25 transmits a print job to an image processing apparatus 10. The mobile terminal 27 is, but not limited to, a so-called personal digital assistant (PDA), smartphone, a mobile phone, or the like, or may be a laptop PC. Note that the print job includes print data for forming an image by using the image processing apparatus 10 and information that is necessary for user authentication. The transmission of the print job and the user authentication will be described later.

Schematic Configuration of Image Processing Apparatus

Figure 2:
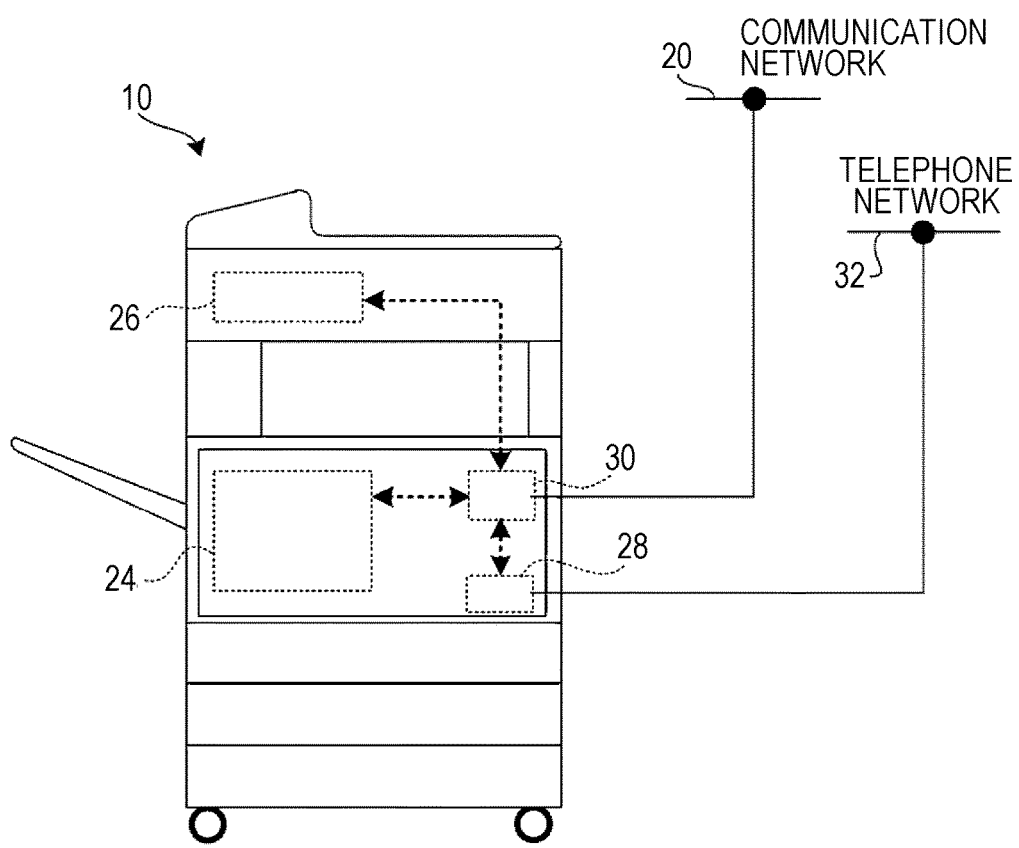
FIG. 2 is a front view of an image processing apparatus according to the exemplary embodiment.

FIG. 2 illustrates the image processing apparatus 10 according to the exemplary embodiment. Note that plural image processing apparatuses 10 may have different appearance or functions depending on manufacturing information including the model, machine type, and grade. However, a typical configuration and typical functions of the image processing apparatuses 10 will be described below.

Thus, the configuration of each image processing apparatus 10 is not limited to the configuration illustrated in FIG. 1 and may be exchanged with a configuration of a new machine type. In addition, the image processing apparatus 10 may individually have an optional function or a new function, and a component may be exchanged with a new one. Furthermore, the image processing apparatus 10 may have some functions (image forming function, image reading function, and facsimile communication function) of a typical configuration, which will be described later.

The image processing apparatus 10 includes, as a typical configuration, an image forming unit 24 that forms an image on a piece of recording paper, an image reading unit 26 that reads a document image, and a facsimile communication control circuit 28. The image processing apparatus 10 also includes a main control unit 30 (hereinafter referred to as "main controller 30") that controls the entire apparatus. The main controller 30 controls the image forming unit 24, the image reading unit 26, and the facsimile communication control circuit 28 such that image data of a document image read by the image reading unit 26 is temporarily stored, or that the read image data is transmitted to the image forming unit 24 or the facsimile communication control circuit 28.

The communication network 20 such as the Internet is connected to the main controller 30, and a telephone network 32 is connected to the facsimile communication control circuit 28. The main controller 30 is connected to, for example, a PC 21 and the mobile terminal 27 via the communication network 20 and receives a print job and performs facsimile reception and transmission through the facsimile communication control circuit 28 via the telephone network 32.

The image reading unit 26 includes a document plate, a scanning drive system, and a photoelectric conversion element. A document is positioned on the document plate. The scanning drive system scans an image of the document positioned on the document plate and irradiates the image with light. The photoelectric conversion element, such as a charge-coupled device (CCD), receives light reflected or transmitted by the scanning of the image with the scanning drive system and converts the light into an electric signal.

The image forming unit 24 includes a photoconductor drum. Around the photoconductor drum, a charging device, a scanning exposure section, an image development section, a transfer section, and a cleaning section are provided. The charging device uniformly charges the photoconductor drum. The scanning exposure section scans the photoconductor drum using a light beam in accordance with image data. The image development section develops an electrostatic latent image that has been formed by scanning the photoconductor drum with the scanning exposure section in such a manner that the photoconductor drum is exposed to the light beam. The transfer section transfers an image that has been developed on the photoconductor drum, onto a piece of recording paper. The cleaning section cleans the surface of the photoconductor drum after transfer is performed. Furthermore, a fixing section that fixes the image which has been transferred onto the piece of recoding paper is provided along a path along which the piece of recording paper is transported.

In the image processing apparatus 10, the image reading unit 26, the image forming unit 24, and the facsimile communication control circuit 28 are operated alone or in combination, thereby executing plural jobs including copying, printing, scanning, and facsimile transmission and reception.

Control Block Diagram

Figure 3:
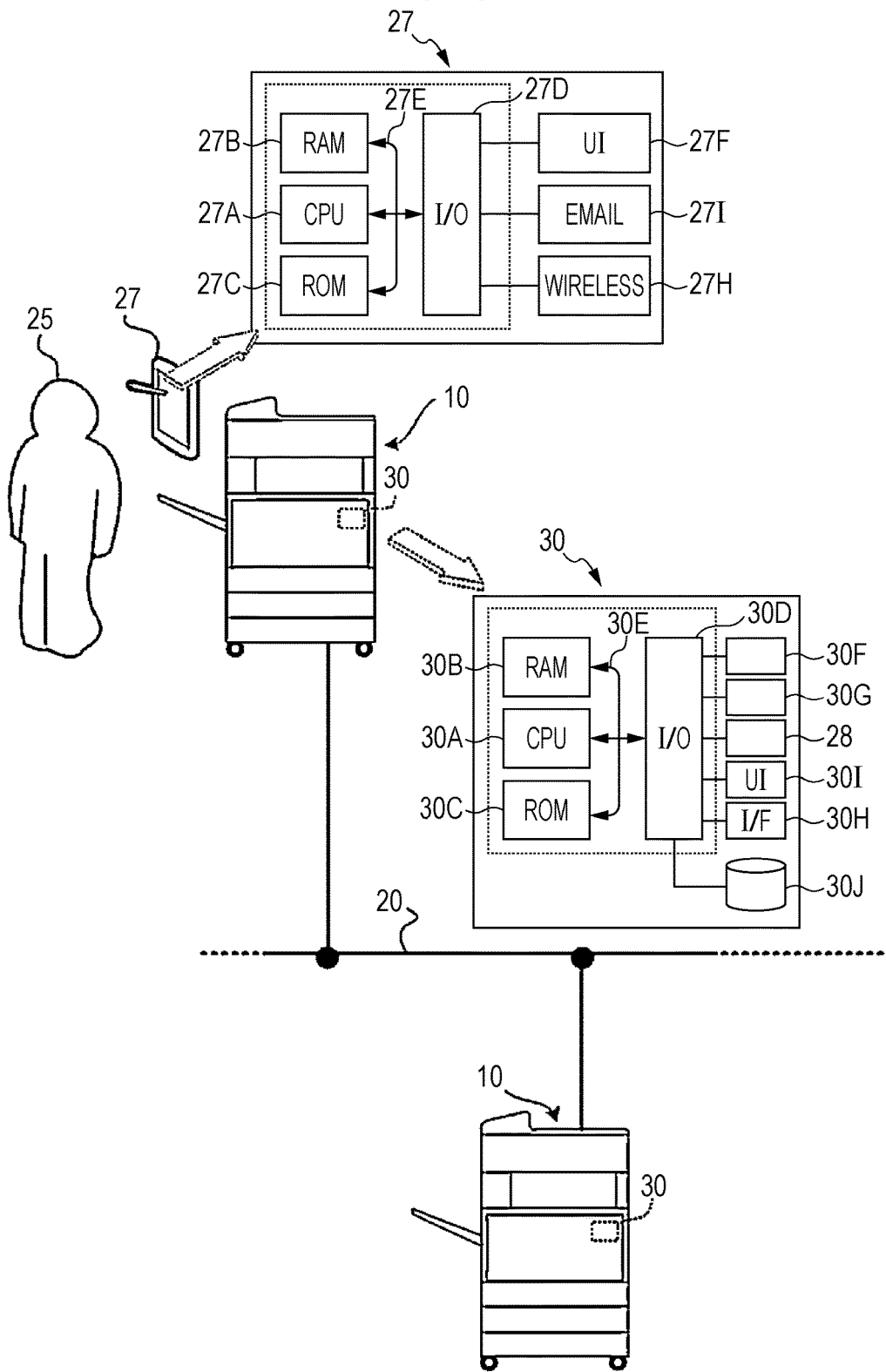
FIG. 3 is a control block diagram of a main controller and a communication terminal apparatus, which cooperate with each other, according to the exemplary embodiment.

FIG. 3 is a control block diagram of the main controller 30 of the image processing apparatus 10 and the mobile terminal 27 carried by the user 25, which cooperate with each other.

As illustrated in FIG. 3, the main controller 30 includes a central processing unit (CPU) 30A, a random access memory (RAM) 30B, a read only memory (ROM) 30C, an input/output (I/O) 30D, and a bus 30E such as a data bus or a control bus that connects the CPU 30A, the RAM 30B, the ROM 30C, and the I/O 30D to one another.

The I/O 30D is connected to an image formation control unit 30F that controls the image forming unit 24, an image reading control unit 30G that controls the image reading unit 26, the facsimile communication control circuit 28, and a user interface (UI) 30I. The I/O 30D is also connected to the communication network 20 through an interface (I/F) 30H. In addition, the I/O 30D is connected to, as an exemplary storage unit, a hard disk 30J (large scale memory device) that stores a print job transmitted from the mobile terminal 27, for example.

As illustrated in FIG. 3, the mobile terminal 27 includes a CPU 27A, a RAM 27B, a ROM 27C, an I/O 27D, and a bus 27E such as a data bus or a control bus that connects the CPU 27A, the RAM 27B, the ROM 27C, and the I/O 27D to one another.

The I/O 27D is connected to a touch panel unit 27F (hereinafter referred to as "user interface (UI) 27F") that serves as both an input device and a display device. The I/O 27D is also connected to a wireless communication I/F 27H and is capable of communicating with the wireless communication apparatus 23 through the wireless communication I/F 27H. In addition, the I/O 27D is connected to an email communication I/F 27I. The email communication I/F 27I is applied as a tool that performs user authentication for the mobile terminal 27 when the user 25 faces the image processing apparatus 10 and logs in to the image processing apparatus 10.

Note that it is possible to use, instead of the email communication I/F 27I, a near field communication I/F (e.g., Bluetooth (registered trademark) I/F) by which communication is enabled with the mobile terminal 27 carried by the user 25 who faces the image processing apparatus 10 to log in to the image processing apparatus 10.

Print Job Instruction from Mobile Terminal

The user 25 who carries the mobile terminal 27 may transmit a print job from the mobile terminal 27 to a specific image processing apparatus 10, and then may approach the specific image processing apparatus 10 to log in to the image processing apparatus 10, perform an authentication process, and perform a print process.

As a comparative example, identification information (user ID) for identifying a mobile terminal is registered in advance in the image processing apparatus 10, and is checked against a user ID of a login user so that user authentication is performed to perform a print process. However, in this case, the user ID of the mobile terminal is managed by the image processing apparatus 10 in addition to the mobile terminal, and accordingly, it is less secure than in a case where the user ID is managed by only the mobile terminal.

If it is less secure, for example, the following may occur: tracking of actions of a user who has used the user ID; replay attack using a false user ID; false representation of user information using a used mobile terminal whose user ID is not changed; and the like.

In a case in which the image processing apparatus 10 and the mobile terminal 27 manage the user ID, if the mobile terminal 27 carried by the user is exchanged, the user ID needs to be registered again.

Accordingly, with a communication unit according to the exemplary embodiment, the image processing apparatus 10 to which a print job is transmitted and to which a request for a print process is transmitted does not register nor manage the user ID, but performs authentication and a print process.

With the communication unit according to the exemplary embodiment, the mobile terminal 27 has a pair of keys (hereinafter referred to as a private key and a public key) with which both encryption and decryption may be performed and performs a print process by using a predetermined communication protocol.

Figure 4:
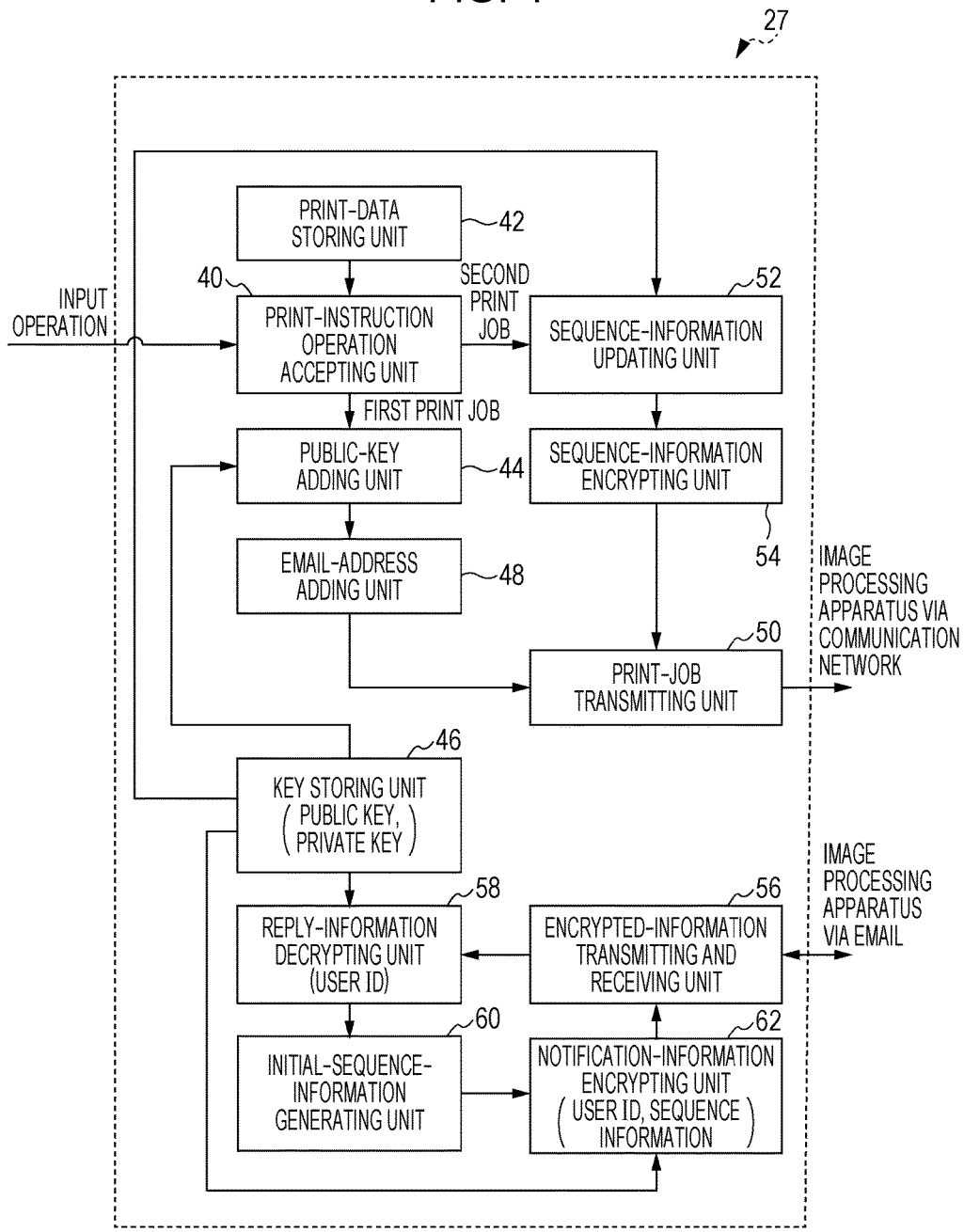
FIG. 4 is a functional block diagram illustrating each function of the mobile terminal according to the exemplary embodiment in a communication process for transmitting a print job and for performing an authentication process.
Figure 5:
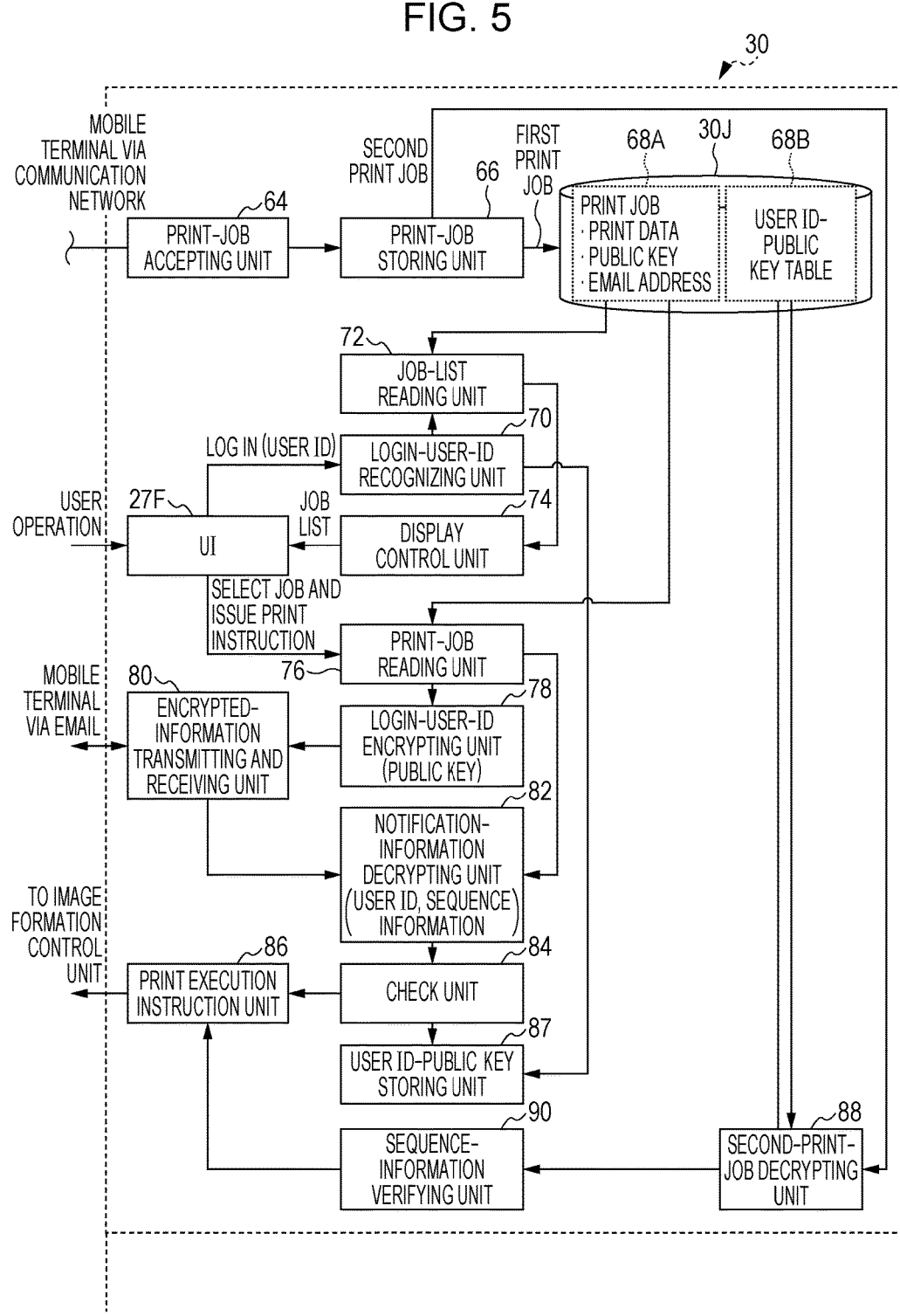
FIG. 5 is a functional block diagram illustrating each function of the image processing apparatus according to the exemplary embodiment in a communication process for accepting a print job and for performing an authentication process.

FIGS. 4 and 5 are block diagrams of functions for communication that is performed mainly for transmitting a print job and for performing an authentication process. FIG. 4 illustrates functions of the mobile terminal 27, and FIG. 5 illustrates functions of the image processing apparatus 10 (the main controller 30). Note that each of the block diagrams in FIGS. 4 and 5 does not limit the hardware configuration, and a software program may be stored so that the CPU (the CPU 27A, the CPU 30A) may perform one or more processes in accordance with the software program.

Mobile Terminal 27

FIG. 4 is a functional block diagram illustrating each function of the mobile terminal 27 in a communication process for transmitting a print job and for performing an authentication process.

A print-instruction operation accepting unit 40 accepts a print instruction issued by a user's input operation.

First Print Job

The print-instruction operation accepting unit 40 is connected to a print-data storing unit 42. In response to a print instruction operation, the print-instruction operation accepting unit 40 reads specific print data from the print-data storing unit 42. If the print-instruction operation accepting unit 40 recognizes that the print instruction is a first print job (described later), the first print job is transmitted to a public-key adding unit 44.

The public-key adding unit 44 reads a public key from a key storing unit 46. An email address adding unit 48 adds an email address (address information of the mobile terminal) to the public key and transmits the public key and the email address to a print-job transmitting unit 50 that is an exemplary first transmission unit (and fourth transmission unit). That is, a set of the print data, the public key, and the email address is generated as a print job (hereinafter referred to as the first print job) and is transmitted from the print-job transmitting unit 50 to a target image processing apparatus 10.

Second Print Job

The first print job is a print job generated in a case in which a user has not performed a login process yet for the target image processing apparatus 10 (has not logged in to the target image processing apparatus 10 yet).

In contrast, in a case in which a user performed a login process for the target image processing apparatus 10 in the past (logged in to the target image processing apparatus 10 before), a second print job is generated as follows. Note that the state in which a user logged in to the target image processing apparatus 10 before corresponds to the presence of a public key that is associated with a user ID, which will be described later.

In response to a print instruction operation, the print-instruction operation accepting unit 40 reads specific print data from the print-data storing unit 42. If the print-instruction operation accepting unit 40 recognizes that the print instruction is the second print job, the print-instruction operation accepting unit 40 instructs a sequence-information updating unit 52 to update sequence information.

The sequence information includes a serial number with which the number of print instructions and a time-series state are recognizable. In other words, the serial number in the sequence information is incremented each time the mobile terminal 27 transmits a print instruction.

Upon the sequence information being updated, the sequence-information updating unit 52 reads a private key from the key storing unit 46 and transmits the private key together with the sequence information to a sequence-information encrypting unit 54. The sequence-information encrypting unit 54 encrypts the updated sequence information by using the private key, and the print-job transmitting unit 50 transmits the encrypted sequence information as the second print job to the target image processing apparatus 10. Note that a user ID is added to the second print job.

Reply from Image Processing Apparatus 10

After the mobile terminal 27 carried by the user 25 has transmitted the first print job to the specific image processing apparatus 10, a reply is supposed to be transmitted to the email address (the mobile terminal 27) added to the first print job by using an email transmitting function of the image processing apparatus 10 as a part of the authentication process of the user who has logged in to the image processing apparatus 10.

The reply is encrypted information. Although details will be described in the description of the functions of the image processing apparatus 10, the encrypted information is information obtained by encrypting the user ID of the login user by using the public key added to the first print job.

An encrypted-information transmitting and receiving unit 56 that is an exemplary second transmission unit receives the encrypted information and transmits the encrypted information to a reply-information decrypting unit 58. The reply-information decrypting unit 58 reads a private key from the key storing unit 46 and decrypts the encrypted information by using the private key. When a user ID that has been decrypted is transmitted to an initial-sequence-information generating unit 60, the initial-sequence-information generating unit 60 generates initial sequence information for the first print job. If the sequence information is a serial number, the initial sequence information is "1".

The initial-sequence-information generating unit 60 is connected to a notification-information encrypting unit 62. The notification-information encrypting unit 62 reads the private key from the key storing unit 46, encrypts the user ID and the initial sequence information to generate notification information by using the private key. The encrypted-information transmitting and receiving unit 56 transmits the notification information to the image processing apparatus 10.

Note that in the implementation, the mobile terminal 27 may determine whether the user ID corresponds to any one of plural user IDs that are stored. If the determination is positive, for example, it may be determined that the print instruction is not the first print job although determined so by the user's misunderstanding, but is the second print job, and as a correction process, the sequence information associated with the corresponding user ID may be updated, the updated sequence information instead of the initial sequence information may be associated with the user ID, and the notification information may be transmitted.

Image Processing Apparatus 10

FIG. 5 is a functional block diagram illustrating each function of the image processing apparatus 10 in a communication process for accepting a print job and for performing an authentication process.

A print-job accepting unit 64 accepts a print job (the first print job or the second print job) transmitted from the mobile terminal 27 and transmits the print job to a print-job storing unit 66.

First Print Job

If the print job is the first print job, the print-job storing unit 66 causes the first print job (the print data, the public key, and the email address) to be stored in a storage area 68A of the hard disk 30J. Note that the case in which the print job is the second print job will be described later.

After a user has transmitted the first print job from the mobile terminal 27 carried by the user, the user faces the UI 27F of the image processing apparatus 10 and performs a user operation including a login operation.

If a user operation is a login operation (input of user ID), the information that has been input by the user operation is transmitted to a login-user-ID recognizing unit 70. The login-user-ID recognizing unit 70 is connected to a job-list reading unit 72, and the job-list reading unit 72 reads a list of jobs (job list) stored in the hard disk 30J, and a display control unit 74 displays the job list on the UI 27F. Note that the job list is not necessarily displayed, and the login user may input and specify the identification information (e.g., file name) of a print job.

If a user operation is job selection (or specification) and print instruction, the information about the user operation is transmitted to a print-job reading unit 76.

The print-job reading unit 76 reads the specified first print job from the hard disk 30J and transmits the first print job to a login-user-ID encrypting unit 78. The login-user-ID encrypting unit 78 encrypts the user ID of the login user by using the public key included in the first print job.

The encrypted user ID is transmitted to the email address included in the first print job from an encrypted-information transmitting and receiving unit 80 that is an exemplary transmission unit (third transmission unit).

The encrypted user ID that has been transmitted is received by the above-described encrypted-information transmitting and receiving unit 56 illustrated in FIG. 4. Thus, the encrypted-information transmitting and receiving unit 80 of the image processing apparatus 10 receives the user ID and the initial sequence information (notification information) that are encrypted by using the private key.

The encrypted information that has been received is transmitted to a notification-information decrypting unit 82, and the notification-information decrypting unit 82 decrypts the encrypted information by using the public key included in the first print job and transmits the user ID to a check unit 84.

The check unit 84 checks the user ID of the login user against the user ID included in the decrypted notification information. If the user IDs are the same, a print execution instruction unit 86 instructs the image formation control unit 30F (see FIG. 3) to execute printing. Note that, although illustration is omitted, if the user IDs are not the same as a result of the check, a certain error process is performed.

If the user IDs are not the same as a result of the check, the check unit 84 instructs a user ID-public key storing unit 87 to cause the user ID of the login user to be stored in a storage area 68B of the hard disk 30J in association with the public key.

Second Print Job

If the print job is the second print job, the print-job storing unit 66 transmits the second print job to a second-print-job decrypting unit 88.

In the second print job, sequence information is encrypted and added to the user ID. On the basis of a user ID-public key table stored in the storage area 68B of the hard disk 30J, the second-print-job decrypting unit 88 reads the public key associated with the user ID that has been added to the second print job, and decrypts the encrypted sequence information.

If the decryption is successful, the user ID is authenticated as the user ID that has been authenticated by using the same mobile terminal 27.

The second-print-job decrypting unit 88 is connected to a sequence-information verifying unit 90. The sequence-information verifying unit 90 verifies the sequence information, checks whether a print job is rewound, and on the basis of the absence of the print job that is rewound, the print execution instruction unit 86 instructs the image formation control unit 30F (see FIG. 3) to execute printing.

Now, operations of the exemplary embodiment will be described.

First Print Job

Figure 6:
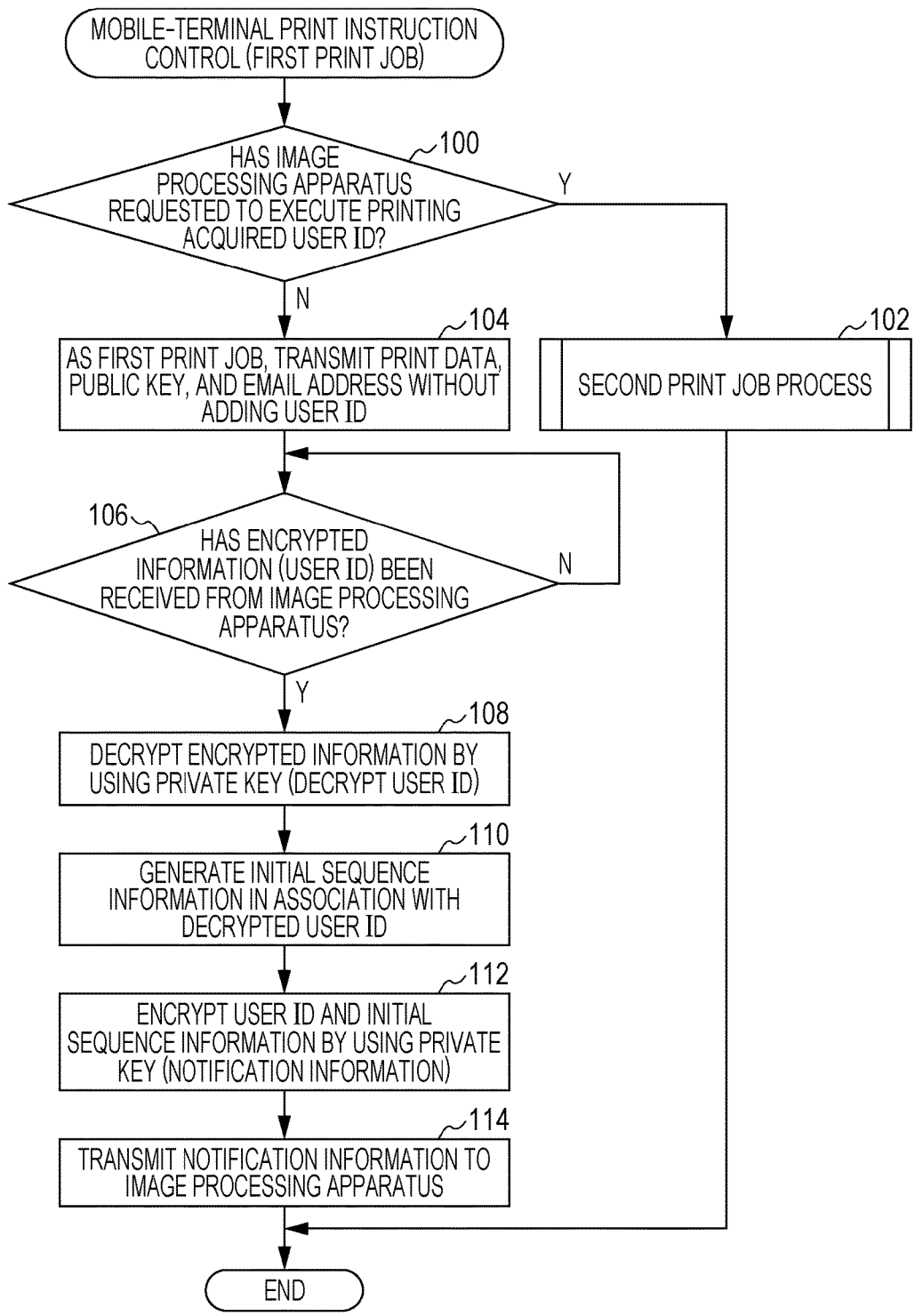
FIG. 6 is a flowchart mainly illustrating the flow of a print instruction control (first print job) performed by the mobile terminal according to the exemplary embodiment.
Figure 7:
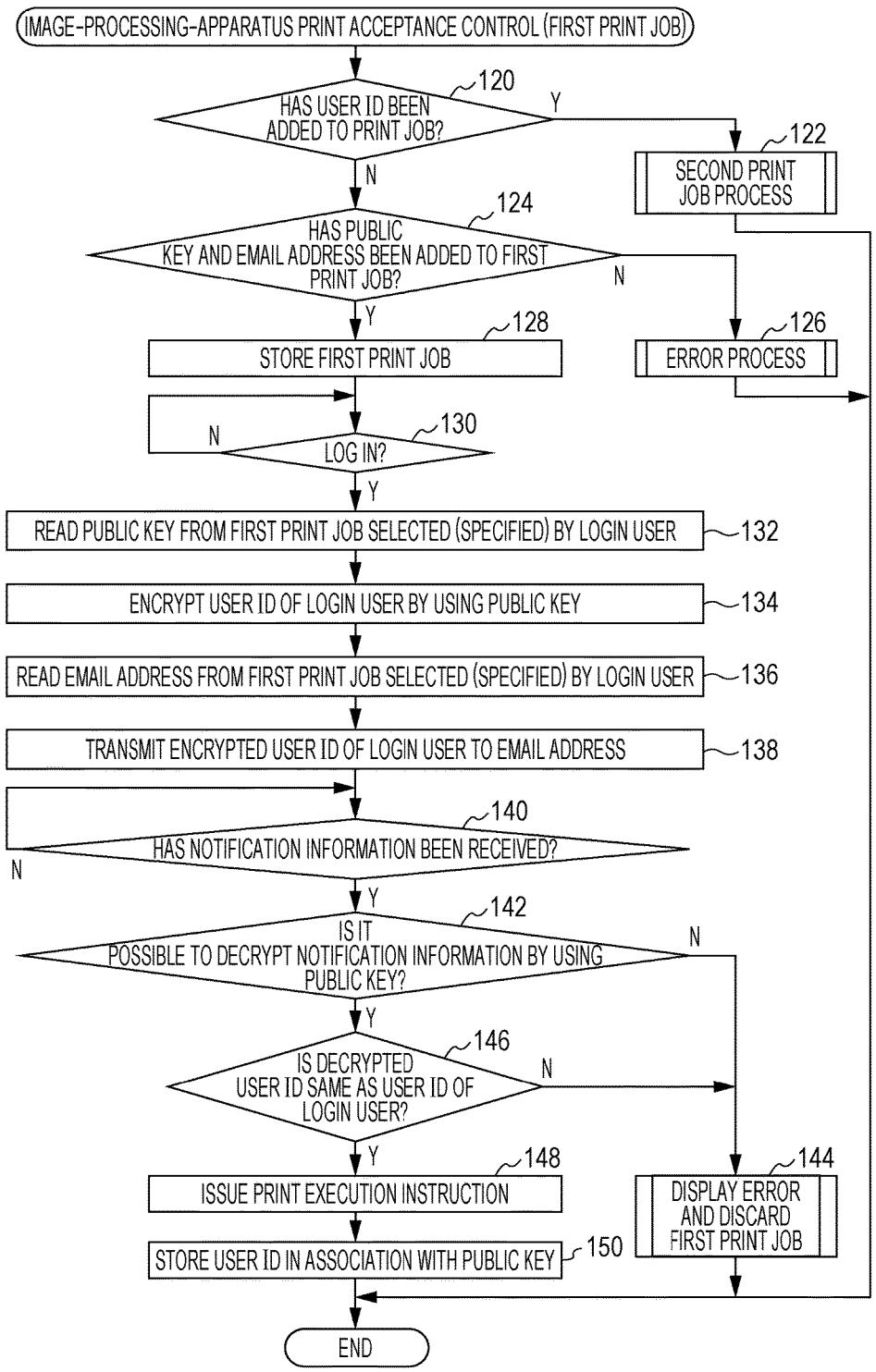
FIG. 7 is a flowchart mainly illustrating the flow of a print acceptance control (first print job) performed by the image processing apparatus according to the exemplary embodiment.

FIGS. 6 and 7 are control flowcharts illustrating the flow of an authentication process performed when an initial print instruction (first print job instruction) is transmitted from the mobile terminal 27 to a specific image processing apparatus 10.

Figure 8:
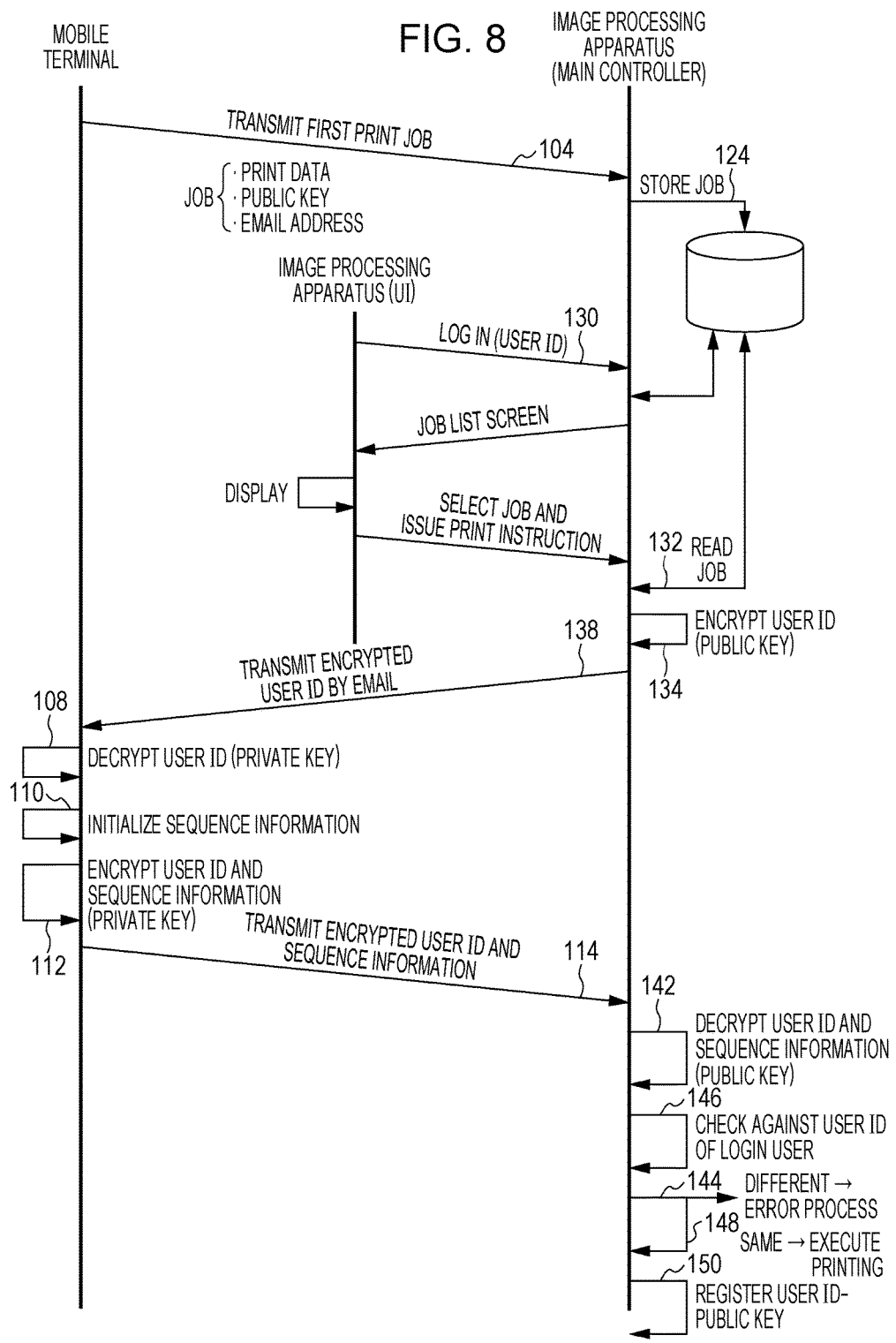
FIG. 8 is a communication protocol (timing chart) illustrating, in a time series manner, both the flowchart in FIG. 6 performed by the mobile terminal and the flowchart in FIG. 7 performed by the image processing apparatus.

Note that FIG. 8 is a communication protocol (timing chart) illustrating, in a time series manner, both the flowchart in FIG. 6 performed by the mobile terminal 27 and the flowchart in FIG. 7 performed by the image processing apparatus 10. Note that the process flow is substantially the same as the process flows in the flowcharts in FIGS. 6 and 7, and accordingly, a detailed description of the communication protocol in FIG. 8 will be omitted by denoting the step numbers illustrated in FIGS. 6 and 7.

FIG. 6 is a flowchart mainly illustrating the flow of a print instruction control (first print job) performed by the mobile terminal 27.

In step 100, the image processing apparatus 10 that is requested to execute printing determines whether the user ID has been acquired. If the determination is positive, since a print job to be executed is the second print job, the process proceeds to step 102, and a second print job process is performed. The second print job process will be described later (see the flowchart in FIG. 9 and the communication protocol in FIG. 11).

If the determination is negative in step 100, since the print job to be executed is the first print job, the process proceeds to step 104. As the first print job, the print data, the public key, and the email address are transmitted to the image processing apparatus 10 without adding the user ID, and the process proceeds to step 106.

In response to the transmission in step 104 and the login of the user to the image processing apparatus 10, in step 106, it is determined whether encrypted information (user ID) transmitted as a reply from the image processing apparatus 10 has been received. If the determination in step 106 is negative, the process waits for the reception.

If the determination in step 106 is positive, the process proceeds to step 108, and the encrypted information is decrypted by using the private key (the user ID is decrypted).

Subsequently, in step 110, initial sequence information is generated in association with the decrypted user ID, and then the process proceeds to step 112. In step 112, the user ID and the initial sequence information are encrypted by using the private key to generate the notification information to be transmitted to the image processing apparatus 10, and the process proceeds to step 114. In step 114, the notification information is transmitted to the image processing apparatus 10, and this routine ends.

FIG. 7 is a flowchart mainly illustrating the flow of a print acceptance control (first print job) performed by the image processing apparatus 10.

In step 120, it is determined whether the user ID has been added to the print job. If the determination is positive, since a print job to be executed is the second print job, the process proceeds to step 122, and a second print job process is performed. The second print job process will be described later (see the flowchart in FIG. 10 and the communication protocol in FIG. 11).

If the determination in step 120 is negative, since a print job to be executed is the first print job, the process proceeds to step 124. In step 124, it is determined whether the public key and the email address have been added to the first print job. If the determination in step 124 is negative, since information is insufficient as the first print job, the process proceeds to step 126, and an error process is performed.

If the determination in step 124 is positive, the process proceeds to step 128. In step 128, the first print job is stored in the storage area 68A (see FIG. 5) of the hard disk 30J, and the process proceeds to step 130.

In step 130, it is determined whether the user 25 (user who has issued a first print job instruction) who carries the mobile terminal 27 has logged in.

In step 130, the process waits for positive determination. If the determination is positive, the process proceeds to step 132. In step 132, the public key is read from the first print job that has been selected (specified) by the login user, and then the process proceeds to step 134. In step 134, the user ID of the login user is encrypted by using the public key, and the process proceeds to step 136.

In step 136, the email address is read from the first print job that has been selected (specified) by the login user, and then the process proceeds to step 138. In step 138, the encrypted user ID (login user) is transmitted to the email address, and the process proceeds to step 140.

In step 140, it is determined whether the notification information in response to the transmission in step 138 has been received. In step 140, the process waits for positive determination. If the determination is positive, the process proceeds to step 142. In step 142, it is determined whether it is possible to decrypt the notification information by using the public key.

If the determination in step 142 is negative, it is determined that the authentication is unsuccessful, and the process proceeds to step 144. In step 144, error display is performed, and the first print job is discarded, thereby ending this routine.

If the determination in step 142 is positive, the process proceeds to step 146, and it is determined whether the decrypted user ID is the same as the user ID of the login user. If the determination in step 146 is negative, it is determined that the authentication is unsuccessful, and the process proceeds to step 144. In step 144, error display is performed, and the first print job is discarded, thereby ending this routine.

If the determination in step 146 is positive, it is determined that the authentication is successful, and the process proceeds to step 148. In step 148, a print execution instruction is issued, and then the process proceeds to step 150. In step 150, the user ID is stored in association with the public key, thereby ending this routine.

When the first print job is transmitted and the user who has performed the transmission approaches the image processing apparatus 10 and logs in to the image processing apparatus 10, the image processing apparatus 10 encrypts the user ID of the login user by using the public key and transmits the encrypted user ID as a reply. Accordingly, the mobile terminal 27 decrypts the encrypted user ID by using the private key to perform checking and encrypts the user ID by using the private key to transmit the user ID as the notification information. Thus, the login user is recognized as the carrier of the mobile terminal 27 that has issued the first print job instruction.

Second Print Job

Figure 9:
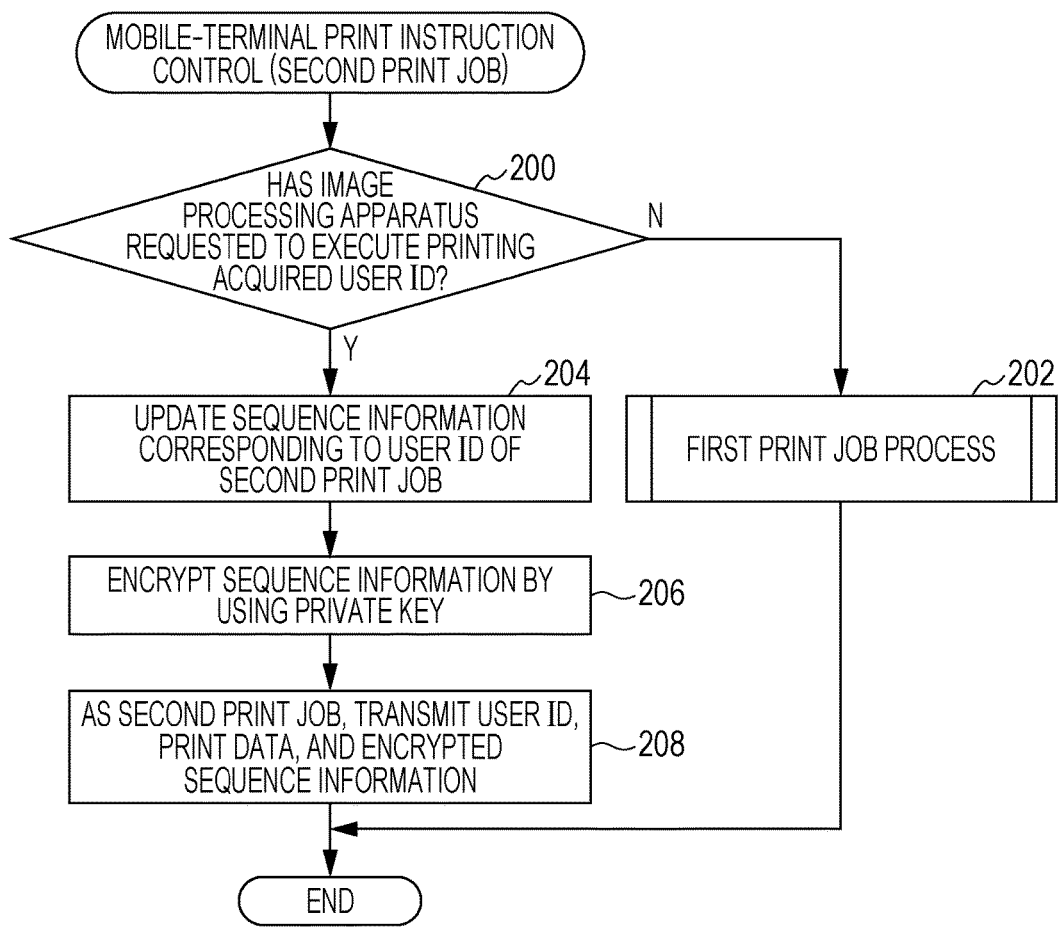
FIG. 9 is a flowchart mainly illustrating the flow of a print instruction control (second print job) performed by the mobile terminal according to the exemplary embodiment.
Figure 10:
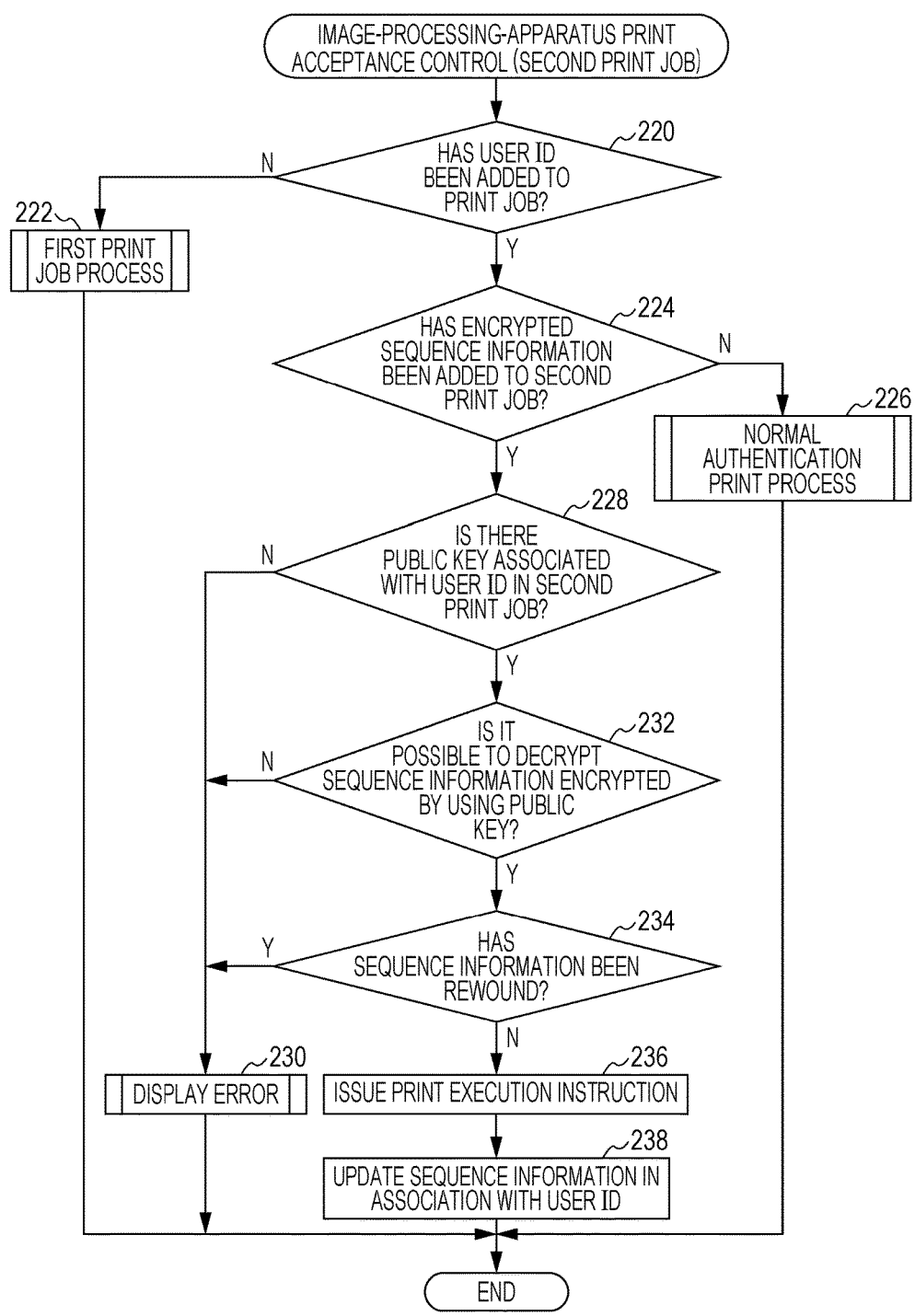
FIG. 10 is a flowchart mainly illustrating the flow of a print acceptance control (second print job) performed by the image processing apparatus according to the exemplary embodiment.

FIGS. 9 and 10 are control flowcharts illustrating the flow of an authentication process performed when a print instruction (second print job instruction) at or after a second time is transmitted from the mobile terminal 27 to a specific image processing apparatus 10.

Figure 11:
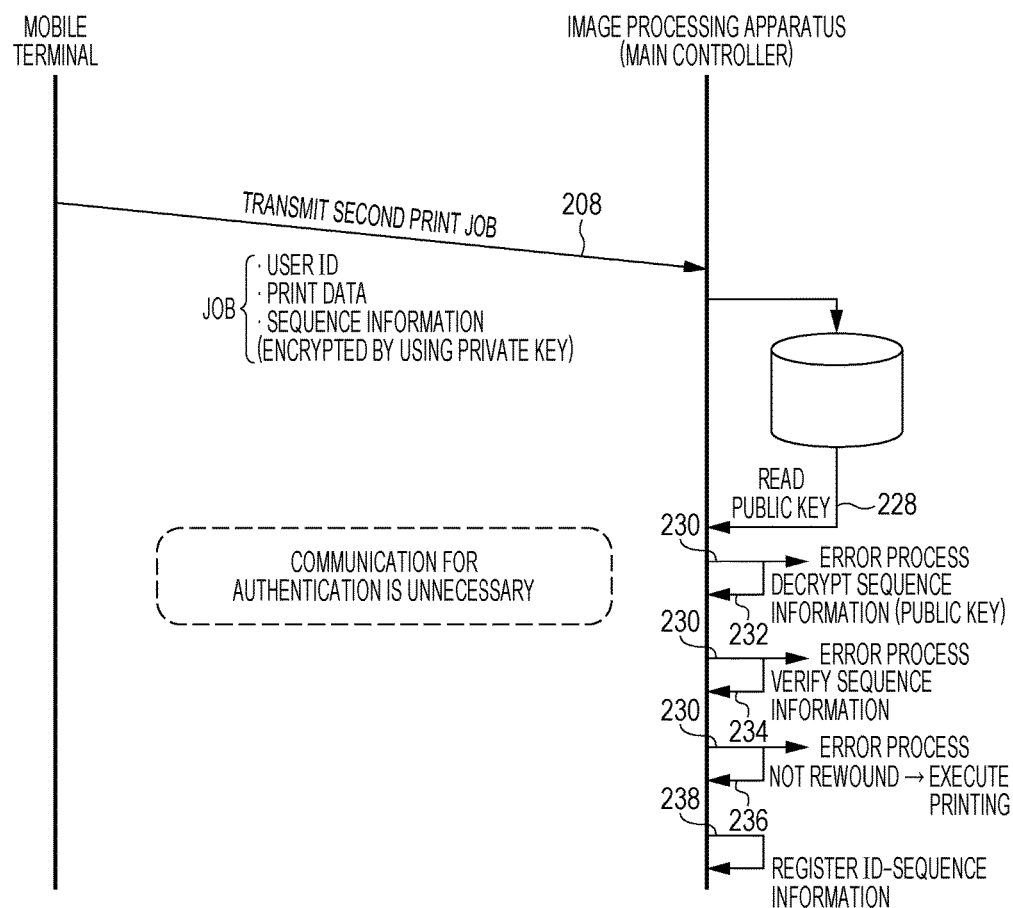
FIG. 11 is a communication protocol (timing chart) illustrating, in a time series manner, both the flowchart in FIG. 9 performed by the mobile terminal and the flowchart in FIG. 10 performed by the image processing apparatus.

Note that FIG. 11 is a communication protocol (timing chart) illustrating, in a time series manner, both the flowchart in FIG. 9 performed by the mobile terminal 27 and the flowchart in FIG. 10 performed by the image processing apparatus 10. Note that the process flow is substantially the same as the process flows in the flowcharts in FIGS. 9 and 10, and accordingly, a detailed description of the communication protocol in FIG. 11 will be omitted by denoting the step numbers illustrated in FIGS. 9 and 10.

FIG. 9 is a flowchart mainly illustrating the flow of a print instruction control (second print job) performed by the mobile terminal 27.

In step 200, the image processing apparatus 10 that is requested to execute printing determines whether the user ID has been acquired. If the determination is negative, since a print job to be executed is the first print job, the process proceeds to step 202, and a first print job process is performed according to the above-described flowchart in FIG. 6.

If the determination in step 200 is positive, since a print job to be executed is the second print job, the process proceeds to step 204. The process in and after step 204 is the second print job process in step 102 in FIG. 6.

In step 204, sequence information corresponding to the user ID in the second print job is updated, and then the process proceeds to step 206. In step 206, the sequence information is encrypted by using the private key, and the process proceeds to step 208.

In step 208, the user ID, the print data, and the encrypted sequence information are transmitted as the second print job to a specific image processing apparatus 10, thereby ending this routine.

FIG. 10 is a flowchart mainly illustrating the flow of a print acceptance control (second print job) performed by the image processing apparatus 10.

In step 220, it is determined whether the user ID has been added to the print job. If the determination is negative, since a print job to be executed is the first print job, the process proceeds to step 222, and a first print job process is performed according to the above-described flowchart in FIG. 7.

If the determination in step 220 is positive, since a print job to be executed is the second print job, the process proceeds to step 224. The process in and after step 224 is the second print job process in step 122 in FIG. 7.

In step 224, it is determined whether the encrypted sequence information has been added to the second print job. If the determination is negative, it is determined that the print job is not the second print job, and the process proceeds to step 226. In step 226, a normal authentication print process is performed, thereby ending this routine.

If the determination in step 224 is positive, the process proceeds to step 228. In step 228, it is determined whether there is a public key associated with the user ID in the second print job. That is, it is determined whether the corresponding user ID is present in the user ID-public key table stored in the storage area 68B of the hard disk 30J.

If the determination in step 228 is negative, it is determined that information is insufficient as the second print job, and the process proceeds to step 230. In step 230, an error process is performed, thereby ending this routine.

If the determination in step 228 is positive, the process proceeds to step 232. In step 232, it is determined whether it is possible to decrypt, by using the public key, the sequence information that is encrypted by using the private key. If the determination in step 232 is negative, it is determined that information is insufficient as the second print job, and the process proceeds to step 230. In step 230, an error process is performed, thereby ending this routine.

If the determination in step 232 is positive, the process proceeds to step 234. In step 234, it is determined whether the sequence information has been rewound.

If the determination in step 234 is negative, it is determined that a certain abnormality in the security has occurred, and the process proceeds to step 230. In step 230, an error process is performed, thereby ending this routine.

If the determination in step 234 is positive, it is determined that information as the second print job is sufficient (authentication is permitted), and the process proceeds to step 236. In step 236, a print execution instruction is issued, and the process proceeds to step 238.

In step 238, the sequence information is updated in association with the user ID, thereby ending this routine.

At or after a second time, without login, the sequence information encrypted by using the private key is decrypted by using the public key associated with the user ID included in the second print job, and a user proves to be a user who has logged in. Accordingly, a special authentication process is unnecessary for executing a print job.

Note that the sequence information is desirable in terms of security. However, the sequence information is not necessary if authentication is specialized. In this case, management information for encrypting information at and after a second time may be set instead of the sequence information.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information management control apparatus comprising:
   a memory configured to store a job in which one of a pair of keys, with which both encryption and decryption are possible, and address information are added; and
   a processor configured to
   encrypt a user ID of a login user by using the one of the keys added in the job and to transmit the encrypted user ID through a communication device in accordance with the address information, the user having been logged in in order to issue an instruction for executing the job, and
   permit execution of the job, in a case in which a user ID and job management information that have been encrypted by using the other of the keys and transmitted in response to the transmission are decrypted by using the one of the keys, the job management information including a job execution history for the user ID, if the user ID is the same as the user ID of the login user and the job execution history does not include an abnormality.

2. The information management control apparatus according to claim 1, wherein
   the memory is configured to store the user ID, for which the execution of the job is permitted, in association with the one of the keys, and
   in a case in which the job is accepted together with a user ID and the job management information that has been encrypted by using the other of the keys, if it is possible to decrypt the job management information by using the one of the keys stored in the memory in association with the accepted user ID, the processor permits the execution of the job.

3. The information management control apparatus according to claim 1, wherein
   the job management information changes each time the processor performs transmission and includes sequence information with which it is possible to acquire the number of times of an identical job.

4. The information management control apparatus according to claim 2, wherein
   the job management information changes each time the processor performs transmission and includes sequence information with which it is possible to acquire the number of times of an identical job.

5. An information management control system comprising:
   a communication device configured to perform communication of information by using a pair of keys, with which both encryption and decryption are possible, between a mobile terminal from which print information and print instruction are transmitted and a processing apparatus that performs a process for executing a job in accordance with an instruction for executing the job transmitted from the mobile terminal,
wherein the mobile terminal includes
  a first processor configured to
    transmit, to the processing apparatus, the job in which one of the pair of keys and address information are added, and
    decrypt a user ID of a login user who has logged in to the processing apparatus, the user ID being accepted in a state of being encrypted by using the one of the keys, to encrypt the user ID and job management information by using the other of the keys, the job management information including a job execution history for the user ID, and to transmit the encrypted user ID and job management information, and
wherein the processing apparatus includes
  a memory configured to store the job that has been transmitted from the first processor and accepted, and
  a second processor configured to
    encrypt the user ID of the login user by using the one of the keys added in the job and to transmit the encrypted user ID in accordance with the address information, the user having been logged in in order to issue an instruction for executing the job stored in the memory, and
    permit execution of the job, in a case in which the user ID and the job management information that have been encrypted by using the other of the keys, transmitted from the first processor, and accepted, are decrypted by using the one of the keys, the job management information including a job execution history for the user ID, if the decrypted user ID is the same as the user ID of the login user and the job execution history does not include an abnormality.

6. The information management control system according to claim 5, wherein
  the memory of the processing apparatus is configured to store the user ID, for which the second processor has permitted the execution of the job, in association with the one of the keys,
  the first processor of the mobile terminal transmits the job together with a user ID and the job management information that has been encrypted by using the other of the keys, and
  if it is possible to decrypt the job management information by using the one of the keys stored in the memory in association with the accepted user ID, the second processor of the processing apparatus permits the execution of the job.

7. The information management control system according to claim 5, wherein
  the job management information changes each time the first processor performs transmission and includes sequence information with which it is possible to acquire the number of times of an identical job.

8. The information management control system according to claim 6, wherein
  the job management information changes each time the first processor performs transmission and includes sequence information with which it is possible to acquire the number of times of an identical job.

\* \* \* \* \*